United States Patent [19]

Udagawa

[11] Patent Number: 4,807,892
[45] Date of Patent: Feb. 28, 1989

[54] STEEL LAMINATE GASKET WITH HIGH SEALING ABILITY

[75] Inventor: Tsunekazu Udagawa, Ichikawa, Japan

[73] Assignee: Ishikawa Gaskit Co., Ltd., Tokyo, Japan

[21] Appl. No.: 193,692

[22] Filed: May 12, 1988

[51] Int. Cl.$^4$ ............................................. F16J 15/08
[52] U.S. Cl. ................................. 277/235 B; 277/200; 277/236
[58] Field of Search .................. 277/200, 207 R, 211, 277/213, 215, 233, 234, 235 R, 235 A, 235 B, 236

[56] References Cited

U.S. PATENT DOCUMENTS

| | | | |
|---|---|---|---|
| 222,388 | 12/1879 | Doty | 277/213 |
| 2,397,597 | 4/1946 | Dunkle | 277/213 |
| 4,676,515 | 6/1987 | Cobb | 277/235 B |
| 4,714,260 | 12/1987 | Udagawa | 277/235 B |

FOREIGN PATENT DOCUMENTS

| | | | |
|---|---|---|---|
| 3245383 | 6/1984 | Fed. Rep. of Germany | 277/235 B |
| 61-105742 | 7/1986 | Japan | |
| 2092244 | 8/1982 | United Kingdom | 277/235 B |

Primary Examiner—Robert S. Ward
Attorney, Agent, or Firm—Frank J. Jordan; C. Bruce Hamburg; Manabu Kanesaka

[57] ABSTRACT

A steel laminate gasket of the invention is used for an internal combustion engine having at least one hole therein. The gasket comprises a first plate and a second plate situated adjacent to the first plate. The first plate is provided with at least one first hole corresponding to the hole of the engine and a first bead situtated adjacent to the first hole to surround the same. The second plate is provided with at least one second hole having a size substantially larger than an area that the first bead surrounds, and a second bead situated adjacent to the second hole to surround the same. When the first and second plates are assembled, the first bead is located inside the second hole, and the second bead abuts against the first plate.

9 Claims, 2 Drawing Sheets

STEEL LAMINATE GASKET WITH HIGH SEALING ABILITY

BACKGROUND OF THE INVENTION AND RELATED ART STATEMENT

The present invention relates to a steel laminate gasket for an internal combustion engine, which can provide strong sealing pressure between two parts.

The steel laminate gasket of the invention can be used widely, such as a regular gasket situated between two engine blocks, cylinder head gasket and manifold gasket. Further, in the gasket of the present invention, cylinder holes Hc, water holes Hw, oil holes Ho and the like, as shown in FIG. 1, can be easily and securely sealed.

In the steel laminate gasket, one of the very important things when the steel laminate gasket is designed is how portions around holes of the engine are securely sealed. If the portions around the holes of the engine are not properly sealed, the engine does not operate as intended. In this respect, there have been proposed many methods.

One of the conventional methods for sealing around holes, such as a cylinder hole Hc, is shown in FIG. 2, wherein a gasket 20 comprises an upper plate 21, a lower plate 24, a middle plate 22, and a middle plate 23 having a bead 23a around a cylinder hole Hc to be sealed. The lower plate 24 is provided with a curved portion 24a located around the hole Hc, and a flange portion 24b situated above the upper plate 21. In the gasket 20, the curved portion 24a together with the bead 23a seals around the hole Hc.

When the gasket 20 is assembled, after the plates are stacked together, the curved portion 24a must be bent. In this respect, in case a hole to be sealed is small, configuration of the hole is complicated or metal quality relative to bending is not good, a curved portion may crack. If a crack is formed on the bending portion, sealing ability of the gasket decreases, and therefore the gasket can not be used any more. Therefore, the bending portion can not be employed for sealing all kinds of holes.

Also, since the sealing around the cylinder hole Hc is made by the bead 23a and the curved portion 24a, in some cases, a sufficient sealing pressure is not obtained. If the pressure in the cylinder hole Hc is too high, the gasket can not seal properly.

When the curved or bending portion is not used, a gasket 25 as shown in FIG. 3 may be used. The gasket 25 comprises an upper plate 26, a lower plate 28 and a middle plate 27 having a bead 27a around a hole Hc. In this gasket 25, the bead 27a only provides a sealing pressure around the hole Hc. Therefore, fluid passing through the hole Hc may possibly permeate through the plates. The sealing ability of the gasket 25 is not good.

In order to securely seal around a cylinder hole Hc in an engine with a cylinder liner, a gasket 30 as shown in FIG. 4 has been proposed, which was on July 4, 1986 in Japanese Utility Model Publication No. 61-105742. The gasket 30 comprises an upper plate 31 with an auxiliary bead 31a, three middle plates 32, 33, 34, and a lower plate 35 with a curved portion 35a and a flange 35b. The middle plates 32, 34 are provided with beads 32a, 34a respectively.

In the gasket 30, the auxiliary bead 31a is located above a cylindrical body of the cylinder liner and beneath the flange 35b to provisionally seal around the cylinder hole Hc, and the beads 32a, 34a are located above a flange of the cylinder liner to mainly seal around the cylinder hole Hc. In the gasket 30, different portions of the cylinder liner are sealed by the different beads.

Accordingly, one object of the present invention is to provide a steel laminate gasket, which can provide high sealing pressure around a hole to be sealed for properly sealing therearound.

Another object of the invention is to provide a steel laminate gasket as explained above, which can seal properly even in a small hole or a hole with a complicated configuration.

A further object of the invention is to provide a steel laminate gasket as explained above, in which thickness of the gasket is very thin.

A still further object of the invention is to provide a steel laminate gasket as explained above, which can be easily and economically manufactured.

Further objects and advantages of the invention will be apparent from the following description of the invention.

SUMMARY OF THE INVENTION

The gasket of the invention is installed in an internal combustion engine having at least one hole therein. The gasket basically comprises a first plate, and a second plate situated adjacent to the first plate.

The first plate includes at least one first hole corresponding to the hole of the engine, and a first bead situated adjacent to the first hole to surround the same. The second plate includes at least one second hole having a size substantially larger than an area that the first bead surrounds to permit the first bead to be located in the second hole when the first and second plates are assembled together, and a second bead situated adjacent to the second hole to surround the same. When the first and second plates are assembled, the second bead abuts against the first plate, and when the gasket is tightened, the first and second beads abut against each other. Preferably, the second bead is smaller in size than that of the first bead. The second plate operates as a surface pressure regulation plate for the first bead of the first plate.

The height of the first bead, i.e. the distance from the outer surface of the first plate at a first bead side to a top of the first bead, is substantially the same as the thickness of the second bead, i.e. the distance from an outer surface of the second plate at a side away from the second bead to a top of the second bead.

The first plate may be made of a material of superior heat resistance. However, the second plate may be made of a material lower in heat resistant than the first plate, because the second plate is not exposed to high temperature as in the first plate since the second plate does not extend beyond the first bead. Creep relaxation of the second plate is efficiently prevented.

The gasket of the invention may be provided further with a third plate situated between the first and second plates. The thickness of the third plate is thinner than the height of the second bead. The third plate operates as a surface pressure regulation plate for the second bead. Also, the second and third plates operate as surface pressure regulation plates for the first bead.

DETAILED DESCRIPTION OF PREFERRED EMBODIMENTS

Figure 1:
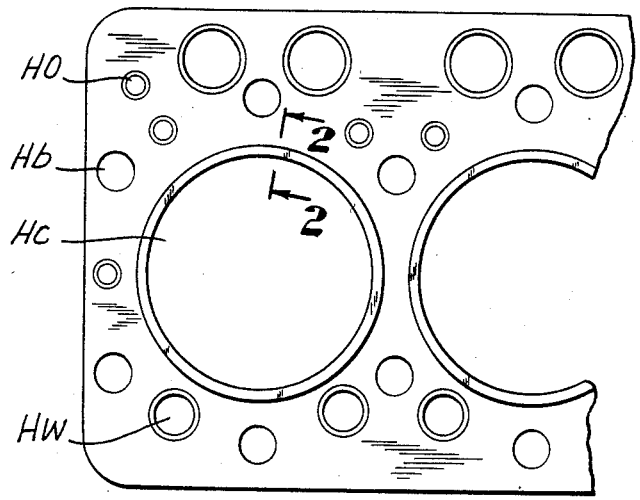
FIG. 1 is a partial plan view of a conventional cylinder head gasket.
Figure 2:
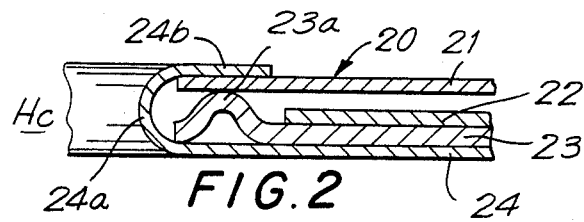
FIG. 2 is an enlarged section view taken along a line 2—2 in FIG. 1.
Figure 3:
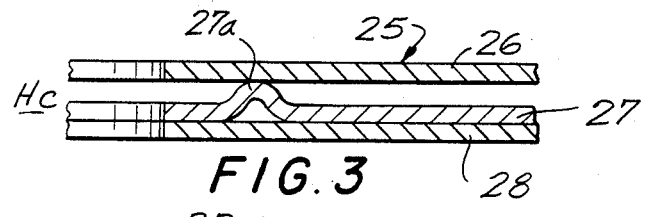
FIGS. 3 and 4 are section views similar to FIG. 2 for showing different conventional gaskets.
Figure 4:
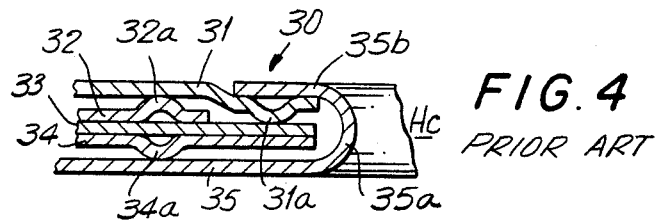
Figure 5:
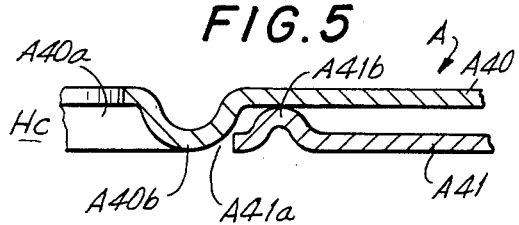
FIG. 5 is an explanatory section view, similar to FIG. 2, of a first embodiment of a steel laminate gasket of the present invention.

A first embodiment A of a steel laminate gasket of the invention is shown in FIG. 5. The gasket A as shown in FIG. 5 is a cylinder head gasket similar to FIG. 1, and is provided with a plurality of holes, i.e. cylinder holes Hc, water holes Hw, oil holes Ho and bolt holes Hb. In the first embodiment, areas around the cylinder holes Hc are sealed in accordance with the present invention, so that an area around the cylinder hole Hc is shown in cross section in FIG. 5. However, the oil holes, water holes and so on may be sealed similarly.

The gasket A comprises an upper plate A40 having a hole A40a for a cylinder hole Hc and a bead A40b formed around the hole A40a, and a lower plate A41 having a hole A41a and a bead A41b formed around the hole A41a. The size of the hole A40a is substantially the same as that of the cylinder hole Hc, but the size of the hole A41a is slightly larger than an area that the bead A40b surrounds. When the upper and lower plates A40, A41 are assembled, the bead A40b is located inside the hole A41a. The lower plate A41 does not overlap the bead A40b.

The size of the bead A40b is relatively large, and the bead A41b is smaller than the bead A40b. Preferably, the height of the bead A40b, i.e. the distance from the lower surface of the plate A40 to the lower point (top) of the bead A40b (in FIG. 5), is substantially the same as the thickness of the bead A41b, i.e. the distance from the lower surface of the lower plate A41 to the top of the bead A41b. However, the thickness of the bead A41b may be slightly larger or smaller than the height of the bead A40b. In this respect, the required thickness of the lower plate A41 is that the lower plate A41 including the bead A41b operates as a surface pressure regulation plate for the bead A40b.

In the gasket A, the lower plate A41 does not overlap the bead A40b, so that although the upper plate A40 is exposed to high temperature at a portion adjacent the cylinder hole Hc, the lower plate A41 is not exposed to high temperature as in the upper plate A40. Accordingly, the upper plate A40 must be made of a material having high heat resistant property, but the lower plate A41 may be made of a material less heat resistant property than the upper plate A40.

Further, since the lower plate A41 is not exposed to high temperature, the creep relaxation of the lower plate A41 is substantially prevented. The gasket A may be used for a long period of time without trouble.

In the gasket A, the size of the bead A40b is different from that of the bead A41b, and the two beads are situated adjacent to each other. Therefore, when the gasket A is situated between a cylinder block and cylinder head (both not shown) and is tightened, the beads A40b, A41b abut against each other, and a plurality of corrugated beads are formed on the respective beads A40b, A41b. The corrugated beads on the beads A40b, A41b possess different sealing characteristics. Since the area around the cylinder hole Hc is sealed by the corrugated beads on the two different beads A40b, A41b, the area around the cylinder hole Hc can be securely sealed.

Further, since the gasket A is made of the upper and lower plates A40, A41, the gasket A is constructed fairly thin. In the present invention, it is possible to provide a thin and light weight gasket with high sealing ability.

Figure 6:
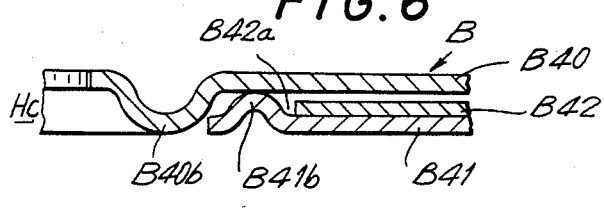
FIGS. 6–9 are section views, similar to FIG. 5, of second to fifth embodiments of the steel laminate gaskets of the invention.

FIG. 6 shows a second embodiment B of the steel laminate gasket of the invention. The gasket B includes an upper plate B40 with a bead B40b, and a lower plate B41 with a bead B41b, similar to the gasket A. However, the gasket B further includes an intermediate plate B42 between the upper and lower plates B40, B41.

The intermediate plate B42 includes a hole B42a larger than an area that the bead B41b surrounds. When the plate B42 is situated between the two plates B40, B41, the bead B41b is located inside the hole B42a. The thickness of the plate B42 is thinner than the height of the bead B41b so that the plate B42 operates as a surface pressure regulation plate for the bead B41b. Also, the plates B41, B42 operate as surface pressure regulation plates for the bead B40b.

In the gasket B, since the intermediate plate B42 is situated between the upper and lower plates B40, B41, even if high tightening pressure is applied to the gasket B, the beads B40b, B41b are not pressurized excessively. The beads B40b, B41b always provide constant sealing pressure.

Figure 7:
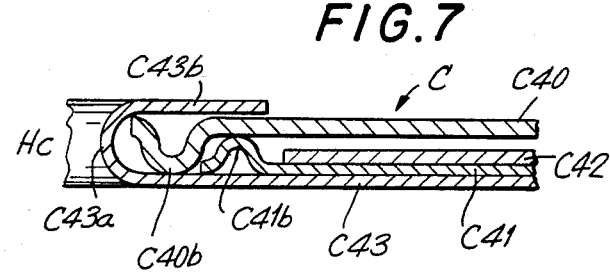

FIG. 7 shows a third embodiment C of the steel laminate gasket of the invention. The gasket C includes an upper plate C40 with a bead C40b, a lower plate C41 with a bead C41b, and an intermediate plate C42, similar to the gasket B. However, the gasket C further includes a plate C43 situated under the plate C41.

The plate C43 is provided with a curved portion C43a situated inside the bead C40b to define the cylinder hole Hc, and a flange C43b situated above the upper plate C40. The flange C43b extends to substantially cover the beads C40b, C41b. In the gasket C, since the bead C40b is covered by the curved portion C43a, the bead C40b is protected from high temperature and pressure by combustion gas in the cylinder.

Further, the thickness of the lower plate C41 is made thinner than that of the upper plate C40, so that the surface pressure formed at the bead C41b can be made weaker than that at the bead C40b. Namely, the surface pressure of the beads may be changed by changing the thickness of the plates to be used.

Also, in case the surface pressure is required to be concentrated around the cylinder hole Hc, it is preferable to form the flange C43b thick. Preferably, the thickness of the flange C43b is made thicker than that of the intermediate plate C42 operating as a surface pressure regulation plate. In this respect, the intermediate plate C42 may be made thicker than the flange C43b, but the thickness of the intermediate plate C42 must be thinner than the sum of the thickness of the flange C43b and the height of the bead C40b.

Figure 8:
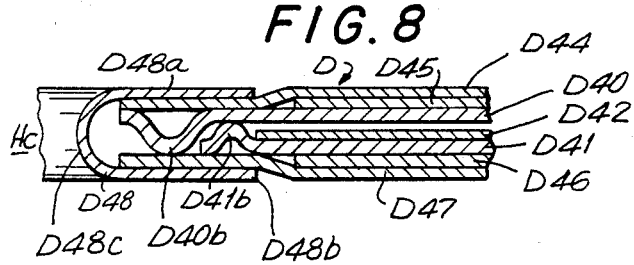

FIG. 8 shows a fourth embodiment D of the steel laminate gasket of the invention. The gasket D includes a plate D40 with a bead D40b, a plate D41 with a bead D41b, and a plate D42, similar to the gasket B. However, the gasket D further includes two outer plates D44, D47, and a grommet D48. A plate D45 is situated between the plates D40, D44, and a plate D46 is situated between the plates D41, D47. An upper flange D48a of the grommet D48 is located above the plate D44, while a lower flange D48b is located under the plate D47. A curved portion D48c of the grommet integrally formed with the flanges D48a, D48b defines the cylinder hole Hc.

In the gasket D, the area around the cylinder hole Hc is covered by the curved portion D48c. As a result, the bead D40b is protected by heat, and the area around the cylinder hole Hc is securely sealed. Also, outsides of the beads D40b, D41b are covered by the outer plates D44, D47 and flanges D48a, D48b, so that high and even sealing pressure is obtained.

Figure 9:
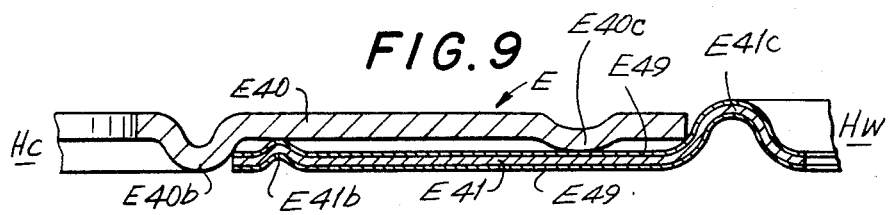

FIG. 9 shows a fifth embodiment E of the steel laminate gasket of the invention. The gasket E includes an upper plate E40 with a bead E40b around the cylinder hole Hc, and a lower plate E41 with a bead E41b, similar to the gasket A. However, the upper plate E40 is further provided with a bead E40c around the water hole Hw, wherein the height and curvature of the bead E40c are lower than those of the bead E40b. On the other hand, the lower plate E41 is further provided with a bead E41c around the water hole Hw, wherein the height of the bead E41c is higher than that of the bead E41b. Also, coatings E49, such as acrylonitrile-butadiene rubber, are formed on both sides of the lower plate E41. The thickness of the upper plate E40 is thicker than that of the lower plate E41.

The gasket E is especially useful in case the sealing condition is different between the cylinder hole Hc and water hole Hw, such as a cylinder head gasket. Namely, since the area around the cylinder hole Hc needs high sealing pressure, the upper plate E40 is made thicker than the lower plate E41, and the curvature of the bead E40b is made more acute than the bead E40c. Also, since the lower plate E41 is not exposed to high temperature, the coatings which is not strong against heat but effective for water, acrylonitrile-butadiene rubber can be used.

In the present invention, the gasket is basically formed of first and second plates with beads respectively. The second plate does not overlap the bead of the first plate and operates as a surface pressure regulation plate for the bead of the first plate. An area around a hole to be sealed is securely sealed by the two beads with different sealing properties.

While the invention has been explained with reference to the specific embodiments of the invention, the explanation is illustrative and the invention is limited only by the appended claims.

What is claimed is:

1. A steel laminate gasket for an internal combustion engine having at least one hole therein, comprising:
   a first plate having at least one first hole corresponding to the hole of the engine and a first bead situated adjacent to the first hole to surround the same, and
   a second plate including at least one second hole having a size substantially larger than an area that the first bead surrounds so that the first bead can be located in the second hole when the first and second plates are assembled, and a second bead situated adjacent to the second hole to surround the same, said second bead extending toward the first plate when the first and second plates are assembled together.

2. A steel laminate gasket according to claim 1, wherein said first and second beads are arranged so that when the gasket is tightened, the first and second beads abut against each other.

3. A steel laminate gasket according to claim 2, wherein said second bead has a size smaller than that of the first bead.

4. A steel laminate gasket according to claim 3, wherein the height of the first bead extending from an outer surface of the first plate at a first bead side to a top of the first bead is substantially the same as the thickness of the second bead extending from an outer surface of the second plate at a side away from the second bead to a top of the second bead.

5. A steel laminate gasket according to claim 4, wherein the first plate is made of a material of superior heat resistance, and the second plate is made of a material lower in heat resistance than the first plate.

6. A steel laminate gasket according to claim 3, further comprising a third plate situated between the first and second plates, said third plate having at least one third hole having a size substantially larger than an area that the second bead surrounds so that the second bead is located inside the third hole when the first to third plates are assembled together.

7. A steel laminate gasket according to claim 6, wherein thickness of the third plate is less than height of the second bead extending from an outer surface of the second plate at a second bead side to the top of the second bead so that the third plate operates as a surface pressure regulation plate.

8. A steel laminate gasket according to claim 7, further comprising a fourth plate having a base portion, at least one fourth hole corresponding to the hole of the engine, a curved portion to define the fourth hole, and a flange having the thickness thicker than the third plate, said base portion, curved portion and flange being integrally formed together and arranged so that the base portion is located outside one of the first and second plates, and the flange extends beyond the first and second beads and is located outside the other of the first and second plates.

9. A steel laminate gasket according to claim 3, further comprising a grommet having upper and lower flanges situated outside the first and second plates to extend over the first and second beads, said flanges having the thickness thicker than the third plate, and a curved portion integrally formed with the upper and lower flanges, said curved portion being located inside the first and second holes.

* * * * *